(12) United States Patent
Tang et al.

(10) Patent No.: US 12,346,549 B2
(45) Date of Patent: Jul. 1, 2025

(54) VIDEO PROCESSING METHOD AND APPARATUS, DEVICE, AND MEDIUM

(71) Applicant: Beijing Zitiao Network Technology Co., Ltd., Beijing (CN)

(72) Inventors: Li Tang, Beijing (CN); Zhiwei Li, Beijing (CN); Lei Lai, Beijing (CN); Zhijian Zeng, Beijing (CN); Siyu He, Beijing (CN); Hao Chen, Beijing (CN); Yongqing Jin, Beijing (CN); Jianxia You, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/676,384

(22) Filed: May 28, 2024

(65) Prior Publication Data

US 2024/0402902 A1 Dec. 5, 2024

Related U.S. Application Data

(63) Continuation of application No. PCT/CN2022/135027, filed on Nov. 29, 2022.

(30) Foreign Application Priority Data

Nov. 29, 2021 (CN) .......................... 202111432171.8

(51) Int. Cl.
*G06F 3/048* (2013.01)
*G06F 3/0486* (2013.01)
*G11B 27/02* (2006.01)

(52) U.S. Cl.
CPC ............ *G06F 3/0486* (2013.01); *G11B 27/02* (2013.01)

(58) Field of Classification Search
CPC .............................. G06F 3/0486; G11B 27/02
See application file for complete search history.

(56) References Cited

U.S. PATENT DOCUMENTS 10,818,058 B1 * 10/2020 Gupta ................... G11B 27/031
11,468,786 B2 * 10/2022 Gupta ..................... G06F 9/453
(Continued)

FOREIGN PATENT DOCUMENTS

| CN | 109688463 A | 4/2019 |
|---|---|---|
| CN | 110868631 A | 3/2020 |

(Continued)

OTHER PUBLICATIONS

International Patent Application No. PCT/CN2022/135027; Int'l Search Report; dated Feb. 8, 2023; 2 pages.
(Continued)

*Primary Examiner* — Rashawn N Tillery
(74) *Attorney, Agent, or Firm* — BakerHostetler

(57) ABSTRACT

Embodiments of the present disclosure relate to a video processing method and apparatus, a device, and a medium. The method includes: obtaining a reference editing operation sequence specified by a user, where the reference editing operation sequence includes at least one reference editing operation arranged in a sequential order of operations; and providing operation prompts according to the sequential order of the reference editing operations, to direct the user to perform the reference editing operations on a target video step by step, where each reference editing operation in the reference editing operation sequence has a corresponding operation prompt.

20 Claims, 5 Drawing Sheets

Obtain a reference editing operation sequence specified by a user — S102

For a first editing operation in the reference editing operation sequence, initiate an operation prompt for a trigger control corresponding to the first editing operation on an editing operation interface, so that the user performs the first editing operation on a target video through the trigger control corresponding to the first editing operation — S104

For a non-first editing operation in the reference editing operation sequence, initiate an operation prompt for a trigger control corresponding to the non-first editing operation on the editing operation interface if it is detected that the user has performed a previous editing operation of the non-first editing operation, so that the user performs the non-first editing operation on the target video through the trigger control corresponding to the non-first editing operation — S106

(56) References Cited

U.S. PATENT DOCUMENTS

| | | | |
|---|---|---|---|
| 11,887,630 B2* | 1/2024 | Wu | G06F 40/186 |
| 2009/0142030 A1 | 6/2009 | Lee et al. | |
| 2012/0284625 A1* | 11/2012 | Kalish | G11B 27/034 |
| | | | 715/723 |
| 2013/0129316 A1* | 5/2013 | Dontcheva | G11B 27/34 |
| | | | 386/E9.011 |
| 2013/0294751 A1 | 11/2013 | Maeda | |
| 2015/0139618 A1* | 5/2015 | Chakra | G09B 7/00 |
| | | | 386/287 |
| 2021/0005223 A1* | 1/2021 | Wang | G06F 3/0482 |
| 2021/0027510 A1* | 1/2021 | Avoyan | G06T 11/60 |
| 2023/0343233 A1* | 10/2023 | He | G11B 27/11 |
| 2024/0013808 A1* | 1/2024 | Liu | G06F 16/748 |
| 2024/0119968 A1* | 4/2024 | Chen | G06F 3/04845 |

FOREIGN PATENT DOCUMENTS

| | | | | |
|---|---|---|---|---|
| CN | 110915224 A | | 3/2020 | |
| CN | 111930994 A | | 11/2020 | |
| CN | 112087652 A | | 12/2020 | |
| CN | 112379805 A | * | 2/2021 | ......... G06F 3/04817 |
| CN | 113079405 A | | 7/2021 | |
| CN | 113518242 A | | 10/2021 | |
| CN | 115633142 A | * | 1/2023 | |
| CN | 116017176 A | * | 4/2023 | |
| CN | 116170549 A | * | 5/2023 | |
| EP | 4258133 A1 | * | 10/2023 | ........... G06F 16/748 |
| JP | 3994359 B2 | * | 10/2007 | |
| JP | 4131300 B2 | * | 8/2008 | ........... G11B 27/034 |
| WO | WO-2008024486 A2 | * | 2/2008 | ........... G11B 27/034 |
| WO | WO-2023185511 A1 | * | 10/2023 | |

OTHER PUBLICATIONS

China Patent Application No. 202111432171.8; Office Action; dated Mar. 14, 2025; 18 pages.

* cited by examiner

VIDEO PROCESSING METHOD AND APPARATUS, DEVICE, AND MEDIUM

CROSS-REFERENCE TO RELATED APPLICATIONS

The present application is a continuation of PCT/CN2022/135027 filed on Nov. 29, 2022, which claims priority to Chinese Application No. 202111432171.8, filed on Nov. 29, 2021, both of which are incorporated herein by reference in their entireties.

TECHNICAL FIELD

The present disclosure relates to the technical field of video processing, and in particular, to a video processing method and apparatus, a device, and a medium.

BACKGROUND ART

In some video editing applications, users are provided with a "Try this template" feature. Specifically, the users are provided with a variety of template videos, which are obtained in advance by performing a series of editing operations, such as special effects, transitions, and speed adjustments, on an original video material. After a user selects a desired template video and a material to be edited, a video editing application edits the material to be edited directly based on the template video, and provides a final edited product to the user. Such a final edited product has the same editing operations as the template video selected by the user, and thus can present the same editing effects.

SUMMARY OF THE INVENTION

According to some embodiments of the present disclosure, a video processing method is provided. The method includes: obtaining a reference editing operation sequence specified by a user, where the reference editing operation sequence includes at least one reference editing operation arranged in a sequential order of operations; and for a first editing operation in the reference editing operation sequence, initiating an operation prompt for a trigger control corresponding to the first editing operation on an editing operation interface, so that the user performs the first editing operation on the target video through the trigger control corresponding to the first editing operation; and for a non-first editing operation in the reference editing operation sequence, initiating an operation prompt for a trigger control corresponding to the non-first editing operation on the editing operation interface if it is detected that the user has performed a previous editing operation of the non-first editing operation, so that the user performs the non-first editing operation on the target video through the trigger control corresponding to the non-first editing operation.

According to some embodiments of the present disclosure, a video processing method is provided. The method includes: obtaining a reference editing operation sequence specified by a user, where the reference editing operation sequence includes at least one reference editing operation arranged in a sequential order of operations; and providing operation prompts according to the sequential order of the reference editing operations, to direct the user to perform the reference editing operations on a target video step by step, where each reference editing operation in the reference editing operation sequence has a corresponding operation prompt.

In some embodiments, the providing operation prompts according to the sequential order of the reference editing operations includes: for a first editing operation in the reference editing operation sequence, initiating an operation prompt for a trigger control corresponding to the first editing operation on an editing operation interface, so that the user performs the first editing operation on the target video through the trigger control corresponding to the first editing operation; and for a non-first editing operation in the reference editing operation sequence, initiating an operation prompt for a trigger control corresponding to the non-first editing operation on the editing operation interface if it is detected that the user has performed a previous editing operation of the non-first editing operation, so that the user performs the non-first editing operation on the target video through the trigger control corresponding to the non-first editing operation.

In some embodiments, the step of obtaining the reference editing operation sequence corresponding to the target video includes: performing editing operation parsing on the template video selected by the user, to obtain an editing operation sequence of the template video, where the template video is a video obtained by editing at least one original material clip in an editing manner indicated by a preset editing template; and using the editing operation sequence of the template video as the reference editing operation sequence specified by the user.

In some embodiments, the method further includes: returning a current editing state presented by the target video to a previous editing state in response to an operation undo instruction of the user, where the current editing state is a video presentation state corresponding to an operation to be undone that is indicated by the operation undo instruction, and the previous editing state is a video presentation state corresponding to a previous editing operation of the operation to be undone.

In some embodiments, the method further includes: performing a specified end operation in response to receiving a stop instruction or in response to completing a last editing operation of the reference editing operation sequence, where the end operation includes: a video save operation and/or a video editing interface exit operation.

In some embodiments, the method further includes: returning a current editing state presented by the target video to an initial state of the target video in response to receiving a restart instruction; and/or returning a current editing state presented by the target video to an initial state of the target video after a last editing operation of the reference editing operation sequence is completed, in response to receiving a loop playback instruction.

In some embodiments, trigger controls corresponding to a plurality of editing operations are displayed on the video editing interface, with the trigger control corresponding to each editing operation being in a disabled state, and the step of initiating the operation prompt for the trigger control corresponding to the non-first editing operation on the editing operation interface includes: switching the trigger control corresponding to the non-first editing operation from the disabled state to an enabled state, and initiating, on the editing operation interface in a specified manner, a prompt message that the trigger control is enabled.

In some embodiments, the providing operation prompts according to the sequential order of the reference editing operations includes: determining a current reference editing operation to be performed based on the sequential order of the reference editing operations and a current presentation state of the target video; and using an icon corresponding to the current reference editing operation to be performed as a target icon, switching the target icon from a disabled state to an enabled state, and initiating, in a specified manner, a prompt message that the target icon is enabled.

In some embodiments, the method further includes: initiating an inquiry message about whether to proceed with video editing, in response to more than a preset duration having lapsed before the user performs a corresponding operation for the initiated operation prompt; and performing a video save operation and/or a video editing interface exit operation, in response to receiving a confirmation instruction not to proceed with video editing.

In some embodiments, the method further includes: waiting, in a specified duration, for the user to perform an operation corresponding to the operation prompt, in response to receiving a confirmation instruction to proceed with video editing.

In some embodiments, an icon corresponding to a play operation, an icon corresponding to a pause operation, and an icon corresponding to a video progress drag operation that are displayed on the video editing interface are all in the enabled state.

According to some embodiments of the present disclosure, a video processing apparatus is further provided. The apparatus includes: a sequence obtaining module configured to obtain a reference editing operation sequence specified by a user, where the reference editing operation sequence includes at least one reference editing operation arranged in a sequential order of operations; and a first prompt module configured to, for a first editing operation in the reference editing operation sequence, initiate an operation prompt for a trigger control corresponding to the first editing operation on an editing operation interface, so that the user performs the first editing operation on the target video through the trigger control corresponding to the first editing operation; and a second prompt module configured to, for a non-first editing operation in the reference editing operation sequence, initiate an operation prompt for a trigger control corresponding to the non-first editing operation on the editing operation interface if it is detected that the user has performed a previous editing operation of the non-first editing operation, so that the user performs the non-first editing operation on the target video through the trigger control corresponding to the non-first editing operation.

According to some embodiments of the present disclosure, a video processing apparatus is further provided. The apparatus includes: a sequence obtaining module configured to obtain a reference editing operation sequence specified by a user, where the reference editing operation sequence includes at least one reference editing operation arranged in a sequential order of operations; and a prompt module configured to provide operation prompts according to the sequential order of the reference editing operations, to direct the user to perform the reference editing operations on a target video step by step, where each reference editing operation in the reference editing operation sequence has a corresponding operation prompt.

In some embodiments, the prompt module includes: a first prompt module configured to, for a first editing operation in the reference editing operation sequence, initiate an operation prompt for a trigger control corresponding to the first editing operation on an editing operation interface, so that the user performs the first editing operation on the target video through the trigger control corresponding to the first editing operation; and a second prompt module configured to, for a non-first editing operation in the reference editing operation sequence, initiate an operation prompt for a trigger control corresponding to the non-first editing operation on the editing operation interface if it is detected that the user has performed a previous editing operation of the non-first editing operation, so that the user performs the non-first editing operation on the target video through the trigger control corresponding to the non-first editing operation.

According to some embodiments of the present disclosure, an electronic device is further provided. The electronic device includes: a processor; and a memory configured to store instructions executable by the processor, where the processor is configured to read the executable instructions from the memory, and execute the instructions to implement the video processing method provided in any one of the embodiments described above.

According to some embodiments of the present disclosure, a computer-readable storage medium is further provided. The storage medium stores a computer program configured to perform the video processing method provided in any one of the embodiments described above.

According to some embodiments of the present disclosure, a computer program is further provided. The computer program includes instructions that, when executed by a processor, cause the processor to perform the video processing method provided in any one of the embodiments described above.

It should be understood that the content described in this section is not intended to identify critical or important features of the embodiments of the present disclosure, and is not used to limit the scope of the present disclosure. Other features of the present disclosure will be easily understood through the following description.

BRIEF DESCRIPTION OF DRAWINGS

The accompanying drawings herein, which are incorporated into and form a part of the description, illustrate the embodiments in line with the present disclosure and are used in conjunction with the description to explain a principle of the present disclosure.

In order to more clearly illustrate the technical solutions in the embodiments of the present disclosure or in the prior art, the accompanying drawings for describing the embodiments or the prior art will be briefly described below. Apparently, those of ordinary skill in the art may still derive other drawings from these accompanying drawings without creative efforts.

DETAILED DESCRIPTION OF THE INVENTION

Figure 1:
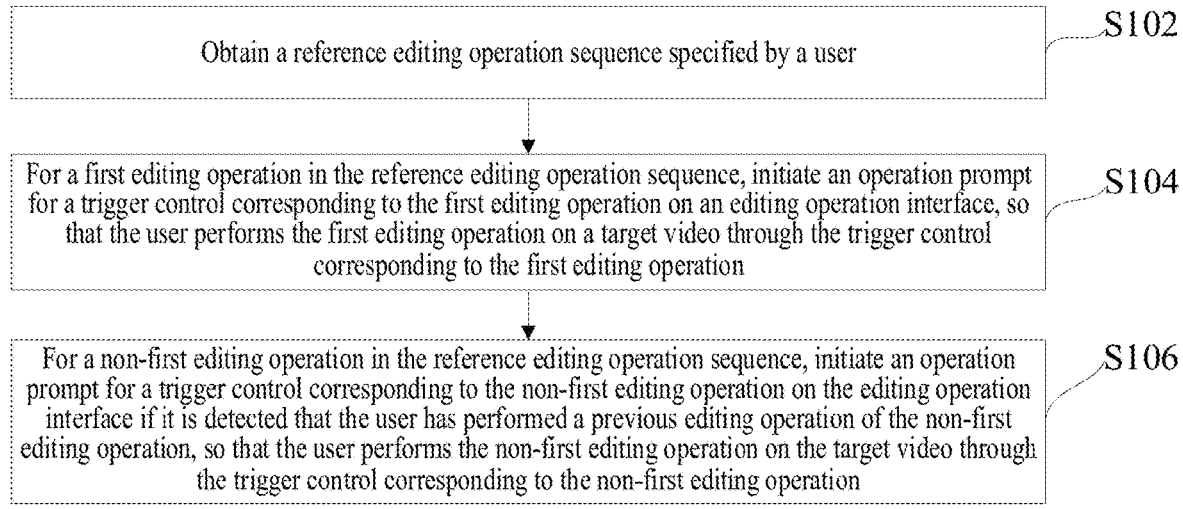
FIG. 1 is a schematic flowchart of a video processing method according to an embodiment of the present disclosure.

For a clearer understanding of the foregoing objectives, features, and advantages of the present disclosure, the solutions of the present disclosure will be further described below. It should be noted that the embodiments in the present disclosure and features in the embodiments can be combined with each other without conflict.

Many specific details are set forth in the following description to facilitate a full understanding of the present disclosure. However, the present disclosure may also be implemented in other ways different from those described herein. Apparently, the embodiments in the description are only some rather than all of the embodiments of the present disclosure.

The inventors have found the following problems: The "Try this template" feature in the existing video editing application edits an original material uploaded by a user directly based on a template video selected by the user, and presents a final edited product to the user. As such, the user has no sense of participation, and the template video is completely a black box for the user. The user needs to guess an editing operation sequence used in the template video, and it is difficult to change the editing operation sequence. For example, it is assumed that an editing sequence used in a template video 1 is ABC, where ABC represent different editing operations such as a transition, a special effect, a speed adjustment. When the user uses the "Try this template" feature for the template video 1, the video editing application also edits a material of the user directly based on the ABC editing sequence, and presents a final edited product to the user. All of the ABC effects have been added to the final edited product, that is, the final edited product that the user sees is final images obtained directly by applying the three effects of ABC. In this case, actually, the user cannot exactly perceive editing operations used in the final edited product, as well as the order of the editing operations. For example, the user cannot exactly perceive whether two or three or four effects have been added to the final edited product. The existing "Try this template" feature actually performs all editing operations on the material of the user at a time, but the specific operations performed are a black box for the user. In addition, it is difficult for the user to adjust the final edited product. Even if the user wants to make changes, the user can only perform subsequent operations based on the final edited product. For example, assuming that a final status of the final edited product after the three operations of ABC is "C done", the user can only perform further processing based on "C done", but cannot make their own material a final edited product that includes only the editing operation A.

In order to mitigate at least one of the above problems, embodiments of the present disclosure provide a video processing method and apparatus, a device, and a medium, which are described in detail below.

FIG. 1 is a schematic flowchart of a video processing method according to an embodiment of the present disclosure. The method may be performed by a video processing apparatus, which may be implemented using software and/or hardware and may generally be integrated into an electronic device. As shown in FIG. 1, the method mainly includes the following steps S102 to S106.

Step S102: Obtain a reference editing operation sequence specified by a user, where the reference editing operation sequence includes at least one reference editing operation arranged in a sequential order of operations.

In some implementations, the user may first upload a target video, and then the reference editing operation sequence specified by the user is obtained in response to an edit instruction of the user for the target video. In some other implementations, an editing operation sequence of a template video may be first used as the reference editing operation sequence specified by the user, in response to a select instruction of the user for the template video, and then the user is prompted to upload the target video based on the reference editing operation sequence, so that the user can edit the target video based on the reference editing operation sequence. The target video may be a video material uploaded by the user in advance, or a video material captured by the user in real time, or a video material selected by the user from a photo album. The edit instruction may be initiated by the user.

For example, in some specific application scenarios, the user selects a video material (the target video) that needs to be edited and a template video that needs to be referenced, and it is considered that the user has initiated the edit instruction once the user selects the "Try this template" feature, or once the user selects a "Replay" feature (replaying an editing operation sequence of the template video) for the template video that needs to be referenced. Then the reference editing operation sequence corresponding to the target video is obtained.

In some specific implementations in which the reference editing operation sequence is obtained, editing operation parsing may be performed on the template video selected by the user, to obtain the editing operation sequence of the template video; and the editing operation sequence of the template video are then used as the reference editing operation sequence specified by the user. The template video is a video obtained by editing at least one original material clip in an editing manner indicated by a preset editing template. The template video may be uploaded by a template creator to a video editing application for public use, or may be released by an official account of the video editing application. The editing template contains information such as types of the editing operations and the order of the operations. Generally, a video (i.e., the template video) obtained based on the editing template is provided to the user in the video editing application, so that the user can intuitively know video effects that the template can achieve. In the video editing application, a plurality of template videos may be provided to the user. Different template videos employ different editing templates, and naturally present different effects. After the user selects the template video that needs to be referenced according to the requirements, the video editing application may perform editing operation parsing on the template video. In other words, the template video is a reference video for which the user wants to use the "Try this template" feature, and the template video may be selected by the user.

In some implementations, the template video is also generated based on the video editing application. Therefore, the video editing application records the editing operation sequence of the reference video. When editing operation parsing is performed on the template video, an editing record of the template video may be directly obtained, and then based on the editing record, the editing operation sequence is obtained.

In some other implementations, since the template video is a video obtained by editing at least one original material clip in an editing manner indicated by a preset editing template, the preset editing template corresponding to the template video may be directly called, and the editing operation sequence may be extracted from the preset editing template.

Step S104: For a first editing operation in the reference editing operation sequence, initiate an operation prompt for a trigger control corresponding to the first editing operation on an editing operation interface, so that the user performs the first editing operation on the target video through the trigger control corresponding to the first editing operation.

In some embodiments, trigger controls (also referred to as editing operation entries) corresponding to a plurality of editing operations may be displayed on the editing operation interface, so that the user can perform corresponding editing operations through the trigger controls. Different trigger controls have different control identifiers (icons) on the editing operation interface. The trigger control may alternatively be displayed in the form of a virtual button. Once the user clicks the virtual button, it is considered that the user enables the trigger control to perform the corresponding editing operation.

Step S106: For a non-first editing operation in the reference editing operation sequence, initiate an operation prompt for a trigger control corresponding to the non-first editing operation on the editing operation interface if it is detected that the user has performed a previous editing operation of the non-first editing operation, so that the user performs the non-first editing operation on the target video through the trigger control corresponding to the non-first editing operation.

As an example, the reference editing operation sequence is ABC. First, an operation prompt is initiated for a trigger control corresponding to the editing operation A. When it is detected that the user has performed the editing operation A, an operation prompt is initiated for a trigger control corresponding to the editing operation B. When it is detected that the user has performed the editing operation B, an operation prompt is initiated for a trigger control corresponding to the editing operation C.

In the above steps S104 and S106, the operation prompts may be initiated based on the reference editing operation sequence, so that the user performs the operations corresponding to the operation prompts for the target video. Each reference editing operation in the reference editing operation sequence has a corresponding operation prompt, and the non-first operation prompt is initiated after the operation corresponding to the previous operation prompt is completed.

That is, the operation prompts may be provided in a sequential order of the reference editing operations contained in the reference editing operation sequence, and each reference editing operation has a corresponding operation prompt. In an example in which the reference editing operation sequence includes sequentially a transition, a special effect, and a speed adjustment, a prompt for the transition may first be initiated; next, a prompt for the special effect may be initiated after the user performs the transition operation; and then, a prompt for the speed adjustment may be initiated after the user performs the special effect operation. The user may perform corresponding operations according to the prompts. Through step-by-step prompts, an effect of replaying the editing operations used in the template video can be achieved on the target video uploaded by the user, allowing the user to clearly know the specific editing operations used in the template video, as well as the order of the operations. If the user no longer performs corresponding operations, the user may exit. In this case, a final edited product of the user may have effects of only some of the editing operations in the template video, for example, may have effects of only the transition and the special effect, thereby better enhancing the flexibility of editing.

In this way, the user may be directed to perform the editing operations on the video step by step through the operation prompts, which enhances the user's sense of participation, and allows the user to clearly know the editing operations that needs to be referenced, without efforts for reverse guessing, and thus is more conducive to flexible video editing.

In addition, considering that the user may have an undo need, the method further includes: returning a current editing state presented by the target video to a previous editing state in response to an operation undo instruction of the user. The current editing state is a video presentation state corresponding to an operation to be undone that is indicated by the operation undo instruction. The previous editing state is a video presentation state corresponding to a previous editing operation of the operation to be undone. The editing state is an operation result corresponding to an editing operation. For example, the reference editing operation sequence includes sequentially three editing operations, namely, a transition, a special effect, and a speed adjustment. It is assumed that after the user performs the transition and the special effect, the current editing state presented by the target video is a state with effects of the transition and the special effect. If the user no longer wants the effect of the special effect, the operation undo instruction may be initiated, thereby returning the target video to a state with only the effect of the transition. In addition, the user can return further, for example, to an initial state of the video with the effect of the transition removed. In this way, the user can edit more freely. The user can perform corresponding operations according to the operation prompts. When a performed operation is found to be inappropriate, the user can also undo the operation and remove a corresponding effect.

Further, in some embodiments, the method further includes: performing a specified end operation in response to receiving a stop instruction or in response to completing a last editing operation of the reference editing operation sequence, where the end operation includes: a video save operation and/or a video editing interface exit operation. That is, when performing video editing based on the reference editing operation sequence, the user may stop the video editing at any time according to the requirements, or when all editing operations are completed. As an example, the reference editing operation sequence includes a total of four editing operations ABCD. The user may stop editing after performing the operation A according to the requirements. In this case, the target video only has an effect corresponding to the operation A (which may also be referred to having only an editing state A). The user may also stop editing after performing the operations ABC according to the requirements. In this case, the target video only has effects corresponding to the three operations ABC. In the related art, the final edited product directly presented to the user by the "Try this template" feature necessarily has the effects corresponding to the four operations ABCD. However, the method provided in this embodiment of the present disclosure allows the user to retain only some of the effects of operations of a template according to the requirements, thereby enabling video editing to be more flexible, and better improving user experience.

Further, in some embodiments, the method further includes at least one of the following: returning a current editing state presented by the target video to an initial state of the target video in response to receiving a restart instruction; or returning a current editing state presented by the target video to an initial state of the target video after a last editing operation of the reference editing operation sequence is completed, in response to receiving a loop playback instruction. In this way, the target video may be directly returned to its initial state. The initial state is a state in which no editing operation has been performed on the target video. In other words, the initial state is a state in which the target video does not include any editing effects.

In some implementations, trigger controls corresponding to a plurality of editing operations are displayed on the video editing interface, with the trigger control corresponding to each editing operation being in a disabled state. For example, trigger controls corresponding to a plurality of editing operations such as a transition, a music addition, a special effect addition, picture-in-picture, and a speed adjustment are presented on the video editing interface. The video editing application usually monitors a state of each trigger control to allow the trigger control to perform an operation corresponding to the icon after being triggered (for example, after the user clicks on the trigger control).

In some embodiments, to allow the user to clearly and accurately know the editing operation sequence of the template video to implement the replay of the editing operations of the template video, the trigger control corresponding to each editing operation may be set to the disabled state. That is, the trigger control in the disabled state cannot be triggered by the user. Based on this, the step of initiating the operation prompt for the trigger control corresponding to the non-first editing operation on the editing operation interface includes: switching the trigger control corresponding to the non-first editing operation from the disabled state to an enabled state, and initiating, on the editing operation interface in a specified manner, a prompt message that the trigger control is enabled. The specified manner may be, for example, highlighting the icon corresponding to the trigger control, or pointing to the trigger control with a specific identifier such as a virtual gesture or a triangle prompt mark. The same is true for the first editing operation.

For example, on the editing operation interface, touch controls corresponding to five editing operations ABCDE are displayed, all of which are in the disabled state. The reference editing operation sequence specified by the user is ABC. When the user starts editing, a touch control A corresponding to the editing operation A is initially switched to the enabled state, so that the user performs the editing operation A through the touch control A. After the user performs the editing operation A, a touch control B corresponding to the editing operation B is switched to the enabled state, so that the user performs the editing operation B through the touch control B. After the user performs the editing operation B, a touch control C corresponding to the editing operation C is switched to the enabled state, so that the user performs the editing operation C through touch control C. In some implementations, after the user performs a corresponding editing operation through a touch control, the touch control is switched to the disabled state again. For example, after the user performs the editing operation A, the touch control A is switched to the disabled state again.

In some implementations, the touch control described above may be displayed in the form of an icon on the editing operation interface. Therefore, the step of initiating operation prompts based on the reference editing operation sequence includes: determining a current reference editing operation to be performed based on the reference editing operation sequence and a current presentation state of the target video; and using an icon corresponding to the current reference editing operation to be performed as a target icon, switching the target icon to an enabled state, and initiating, in a specified manner, a prompt message that the target icon is enabled.

As an example, the reference editing operation sequence includes sequentially four editing operations ABCD. When the target video is in the initial state, it is determined that the current reference editing operation to be performed is the operation A. At this time, an icon corresponding to the operation A is switched to the enabled state, and a prompt message that the icon A is enabled is initiated in the specified manner. After the user triggers the icon A to perform the operation A, a current presentation state of the target video is a state with an effect A. At this time, it is determined that the current reference editing operation to be performed is the operation B. Then, an icon corresponding to the operation B is switched to the enabled state, and a prompt message that the icon B is enabled is initiated in the specified manner. After the user triggers the icon B to perform the operation B, a current presentation state of the target video is a state with effects A and B. At this time, it is determined that the current reference editing operation to be executed is the operation C, and so on, and details are not described herein again. In actual applications, the specified method described above may be, for example, highlighting the icon, or pointing to the icon with a specific identifier such as an arrow, a triangle, or a virtual finger, which is not limited herein.

An icon corresponding to a play operation, an icon corresponding to a pause operation, and an icon corresponding to a video progress drag operation displayed on the video editing interface are all in the enabled state.

Further, in some embodiments, the method further includes: initiating an inquiry message about whether to proceed with video editing, in response to more than a preset duration having lapsed before the user performs a corresponding operation for the initiated operation prompt; performing at least one of a video save operation and a video editing interface exit operation, in response to receiving a confirmation instruction not to proceed with video editing; and waiting for the user to perform the operation corresponding to the operation prompt for a specified duration, if a confirmation instruction to proceed with video editing is received.

The above video processing method provided in this embodiment of the present disclosure mainly parses the template video to obtain an operation sequence of the template video (that is, the reference editing operation sequence), and implements the replay of editing states for the operation sequence of the template video. During specific implementation, the editing states may be recorded by a state machine, to implement a single-step replay (for example, replaying step by step in the order of ABC) or a partial replay (for example, replaying only AB) of the editing states. In addition, the video may also be returned (back), such as from an ABC state to an AB state.

Figure 2:
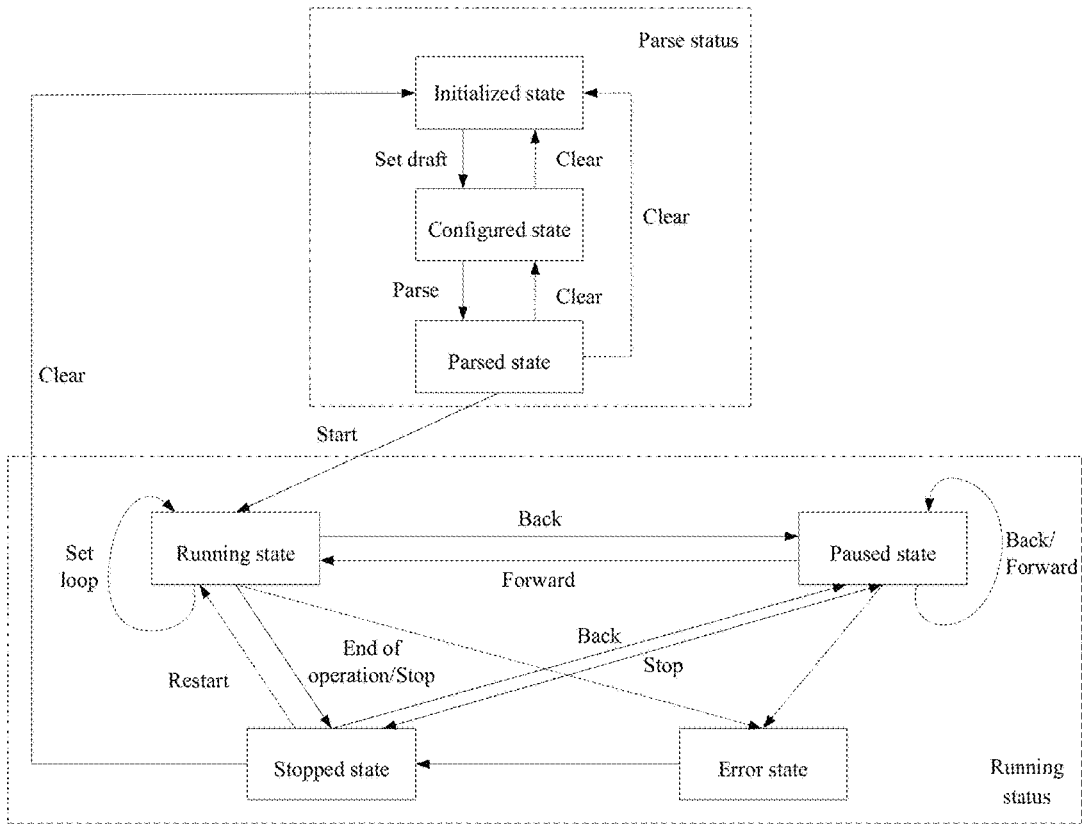
FIG. 2 is a schematic diagram of state transition according to an embodiment of the present disclosure.

For ease of understanding, reference may be made to a schematic diagram of state transition shown in FIG. 2, which mainly shows a parse status and a running status. The parse status includes an initialized state (Uninitialized), a configured state (Configured), and a parsed state (Parsed). After the template parsing is completed, the running status may be automatically entered. The running status mainly includes a running state (Running), a paused state (Paused), a stopped state (Stopped) and an error state (Error). Different states can also be transitioned to each other. Operations such as clear (Clear), restart (Restart), back (Back), forward (Forward), set loop (Set Loop), end of operation/stop (End of Operation/stop), etc. may also be performed according to instructions of the user. The parse status, the running status, and the respective sub-states contained that are described above are managed by a state machine (a finite-state automaton). The above state transition allows the template video (template/draft) to be parsed to obtain the reference editing operation sequence, and a replay to be performed on each editing operation/editing state in the reference editing operation sequence in this embodiment of the present disclosure. Specifically, a single-step replay (that is, a step-by-step replay), a partial replay based on undo/redo (that is, only replaying some of the operations by means of midway stop/undo, etc.) and other effects may be achieved, where undo is used to record data before modification; and redo is used to record data after modification.

It should be noted that the state machine described above controls the pause, forward, back, etc. of the operation states. Instead, in the related art, only a playback progress is paused in the "Try this template" feature, which is a pause in time rather than a pause of the operation states.

Specifically, the video is in the initialized state at the beginning, enters the configured state after the user sets a draft (the template video), and then enters the parsed state when the operations are parsed. The parsed state may be returned to the initial state at any time (due to draft parsing errors, etc.), and a result constructed after parsing is serialized editing operations (the reference editing operation sequence). Then, the video may automatically start to enter the running state. An initial state of the running stage is running. When performing a replay on the editing operation sequence, the video may keep in the running state throughout. After some of the operations are performed, the user may choose to undo a previous operation, and the video enters the paused state. The running state always represents the latest state of a timeline and the operation sequence. The paused state may maintain an operation stack by itself. If back, the undo operation of the user is pushed into the stack. If forward, an apply operation is popped out of the stack. In addition, a status check is performed, and if the stack is empty, the video is returned to the running state. In addition, the setting of loop playback may also be supported. That is, after the operation sequence is constructed, it can automatically jump back to the state at the very beginning. In a non-loop situation, it can be monitored that the operation sequence enters the stopped state when running to the end. Alternatively, the user may actively enter the stopped state to enable the partial replay. The stopped state may be returned to the original running state through a restart operation, or may directly be returned to the parse status through a clear operation, and the draft is changed for parsing again. In addition, during the replay process of the editing states, if a non-crash error occurs and the video enters the error state, it may automatically jump to the stopped state after error information is captured.

Figure 3:
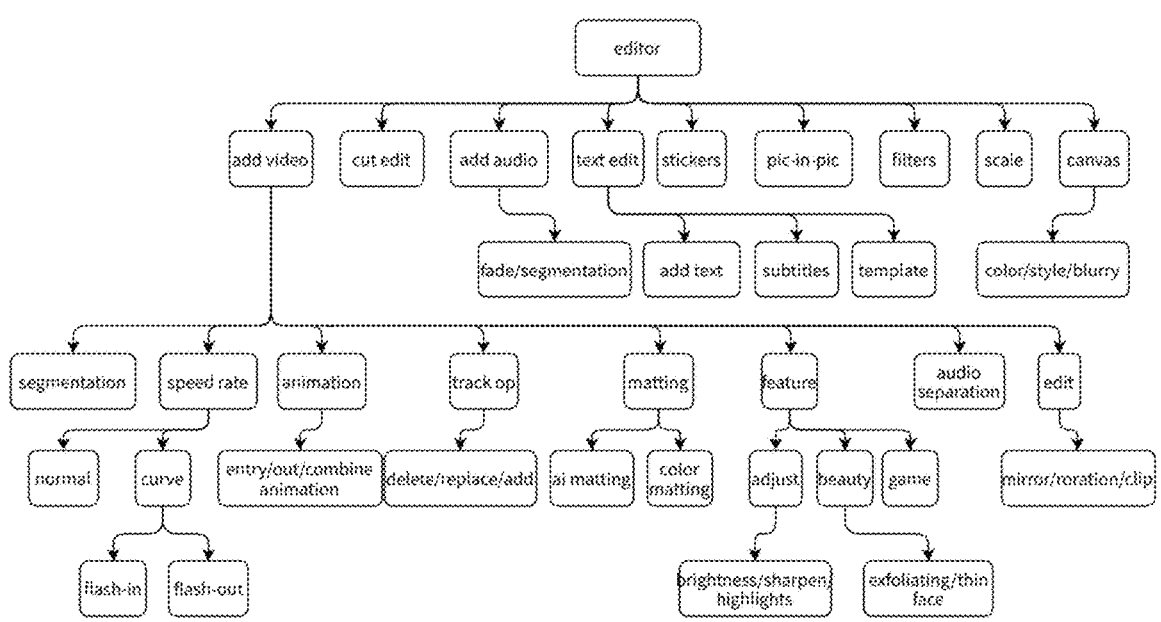
FIG. 3 is a schematic diagram of a structure of an operation sequence tree according to an embodiment of the present disclosure.

In addition, in some implementations, the editing operation sequence may be obtained by parsing the operation sequence of the draft, and an operation serialization order may be determined by an operation tree (for example, the video needs to be added first before being trimmed, etc.). Specifically, an operation serialization result may be obtained according to a breadth-first traversal method or a depth-first traversal method. An embodiment of the present disclosure provides a schematic diagram of a structure of an operation sequence tree as shown in FIG. 3, which shows that the editing operations (editor) may be divided into a plurality of operations, such as add video, cut edit, add audio, text edit, stickers, picture-in-picture (pic-in-pic), filters, and canvas. Further, the add video operation is further split into operations such as segmentation, speed rate, animation, track op, matting, feature, audio separation, and edit. The add audio operation is further split into a fade/segmentation operation. The text edit operation is further split into add text, subtitles, and template operations, etc. The canvas operation is further split into color, style, and blurry operations, etc. In addition, the speed rate operation is further split into normal and curve operations. The animation operation is further split into entry/out/combine animation operations. The track op operation is further split into delete, replace, and add operations. The matting operation is further split into ai matting and color matting operations. The feature operation is further split into adjust, beauty, and game operations. The edit operation is further split into mirror, rotation, and clip operations. The curve operation is further split into flash-in and flash-out operations. The adjust operation is further split into brightness, sharpen, and highlights operations. The beauty operation is further split into exfoliating and thin face operations. It should be noted that the above are only examples of the editing operations and should not be considered as limitations.

Figure 4A:
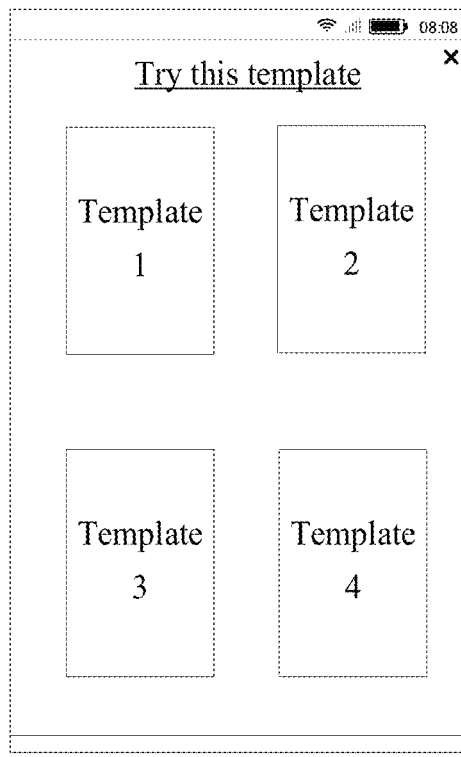
FIGS. 4a, 4b, 4c are all schematic diagrams of interfaces of a video editing application according to an embodiment of the present disclosure.
Figure 4B:
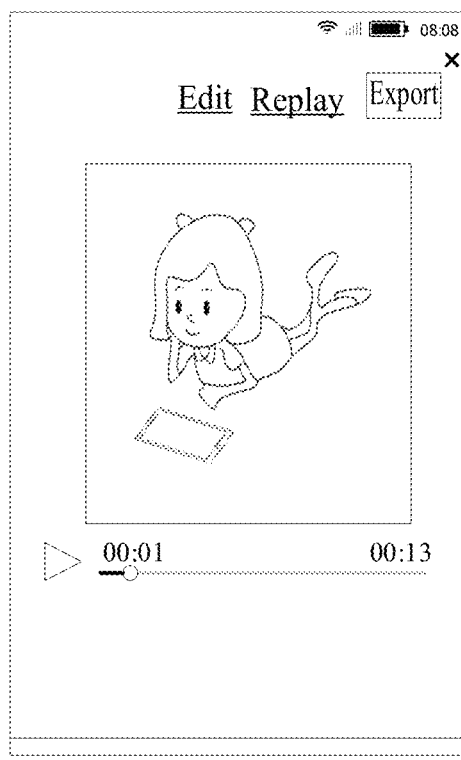
Figure 4C:
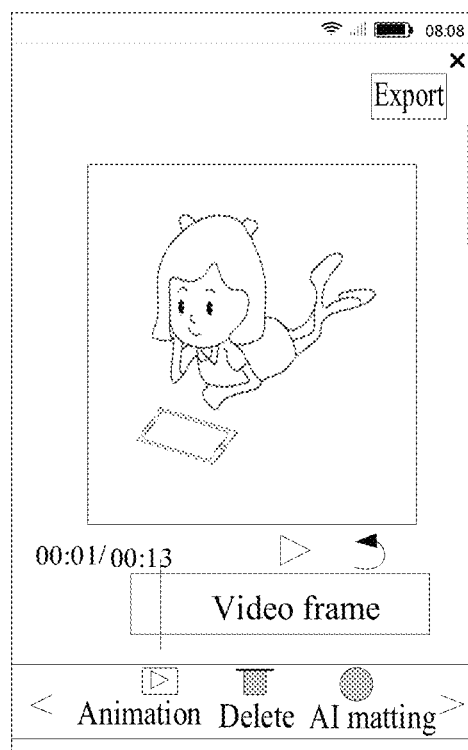

Based on the foregoing description, for ease of understanding, embodiments of the present disclosure provide schematic diagrams of interfaces of a video editing application as shown in FIG. 4a to FIG. 4c. FIG. 4a simply shows a template selection interface, through which a user may select a desired template video for the "Try this template" feature, and further shows that each template video is marked with the number of users and likes. FIG. 4a simply shows four example template videos (simply labeled as Template 1 to Template 4). FIG. 4b simply shows a feature selection interface for a material uploaded by a user. When the user selects a "Replay" feature, it means that the user desires to replay an editing operation sequence of a selected template video, that is, to display operations in the template video one by one, so that the user is directed to perform operations on the uploaded material step by step. A video interface is used to assist the user in perceiving an editing effect that is produced after an editing operation is performed. In other words, after the user selects the template video, the template video is parsed to obtain an editing operation sequence (i.e., the reference editing operation sequence), on the basis of which the video editing application can directly perform a replay of "the reference editing operation sequence" for the material uploaded by the user, to direct the user to edit the uploaded material based on the reference editing operation sequence step by step. During this operation process, any time-related operations performed by the user on image playback (such as pausing in time, dragging a progress bar, etc.) are allowed. However, such operations are not editing operations in the embodiments of the present disclosure, and do not belong to the replay of the reference editing operation sequence.

FIG. 4c shows that when the reference editing operation sequence is being replayed, an "animation" operation is prompted. It can be seen that except for a play/pause button and an undo button, the rest are in gray (indicating the disabled state). In addition, the user may also drag the progress bar according to the requirements. It should be noted that time-related operations such as controlling video play/pause or adjusting the progress in time are not editing operations, and are therefore always open to the user. After the user clicks an "animation" button, an "entry animation" operation may further be prompted to direct the user to implement the replay of the reference editing operation sequence step by step, allowing the user to clearly know the types of editing operations used in the reference template, as well as the order of the editing operations. During the replay process, the user may alternatively replay only some of the editing operations according to the requirements, so that only some of the editing effects of the material uploaded by the user are identical to those of the template.

Corresponding to the above video processing method, an embodiment of the present disclosure provides a video processing apparatus. In some embodiments, the video processing apparatus includes: a sequence obtaining module configured to obtain a reference editing operation sequence specified by a user, where the reference editing operation sequence includes at least one reference editing operation arranged in a sequential order of operations; and a prompt module configured to provide operation prompts according to the sequential order of the reference editing operations, to direct the user to perform the reference editing operations on a target video step by step, where each reference editing operation in the reference editing operation sequence has a corresponding operation prompt.

In some embodiments, the prompt module is configured to determine a current reference editing operation to be performed based on the sequential order of the reference editing operations and a current presentation state of the target video; and using an icon corresponding to the current reference editing operation to be performed as a target icon, switching the target icon from a disabled state to an enabled state, and initiating, in a specified manner, a prompt message that the target icon is enabled.

Figure 5:
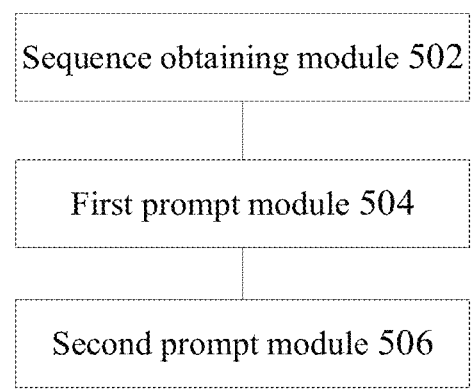
FIG. 5 is a schematic diagram of a structure of a video processing apparatus according to an embodiment of the present disclosure.

FIG. 5 is a schematic diagram of a structure of a video processing apparatus according to some other embodiments of the present disclosure. The apparatus may be implemented by software and/or hardware and may generally be integrated into an electronic device. As shown in FIG. 5, the apparatus includes: a sequence obtaining module 502, a first prompt module 504, and a second prompt module 506.

The sequence obtaining module 502 is configured to obtain a reference editing operation sequence specified by a user, where the reference editing operation sequence includes at least one reference editing operation arranged in a sequential order of operations.

The first prompt module 504 is configured to, for a first editing operation in the reference editing operation sequence, initiate an operation prompt for a trigger control corresponding to the first editing operation on an editing operation interface, so that the user performs the first editing operation on the target video through the trigger control corresponding to the first editing operation.

The second prompt module 506 is configured to, for a non-first editing operation in the reference editing operation sequence, initiate an operation prompt for a trigger control corresponding to the non-first editing operation on the editing operation interface if it is detected that the user has performed a previous editing operation of the non-first editing operation, so that the user performs the non-first editing operation on the target video through the trigger control corresponding to the non-first editing operation.

In this way, the user may be directed to perform the editing operations on the video step by step through the operation prompts, which enhances the user's sense of participation, and allows the user to clearly know the editing operations that needs to be referenced, without efforts for reverse guessing, and thus is more conducive to flexible video editing.

In some implementations, the sequence obtaining module 502 is specifically configured to: perform editing operation parsing on the template video selected by the user, to obtain an editing operation sequence of the template video, where the template video is a video obtained by editing at least one original material clip in an editing manner indicated by a preset editing template; and use the editing operation sequence of the template video as the reference editing operation sequence specified by the user.

In some implementations, the apparatus further includes: an undo module configured to return a current editing state presented by the target video to a previous editing state in response to an operation undo instruction of the user, where the current editing state is a video presentation state corresponding to an operation to be undone that is indicated by the operation undo instruction, and the previous editing state is a video presentation state corresponding to a previous editing operation of the operation to be undone.

In some implementations, the apparatus further includes: an end module configured to perform a specified end operation in response to receiving a stop instruction or in response to completing a last editing operation of the reference editing operation sequence, where the end operation includes: at least one of a video save operation and a video editing interface exit operation.

In some implementations, the apparatus further includes: an initial return module configured to: return a current editing state presented by the target video to an initial state of the target video in response to receiving a restart instruction; and/or return a current editing state presented by the target video to an initial state of the target video after a last editing operation of the reference editing operation sequence is completed, in response to receiving a loop playback instruction.

In some implementations, trigger controls corresponding to a plurality of editing operations are displayed on the video editing interface, with the trigger control corresponding to each editing operation being in a disabled state. The second prompt module 506 is specifically configured to: switch the trigger control corresponding to the non-first editing operation from the disabled state to an enabled state, and initiate, on the editing operation interface in a specified manner, a prompt message that the trigger control is enabled.

In some embodiments, an icon corresponding to a play operation, an icon corresponding to a pause operation, and an icon corresponding to a video progress drag operation that are displayed on the video editing interface are all in the enabled state.

In some implementations, the apparatus further includes: an inquiry module configured to initiate an inquiry message about whether to proceed with video editing in response to more than a preset duration having lapsed before the user performs a corresponding operation for the initiated operation prompt; and an exit module configured to perform a video save operation and/or a video editing interface exit operation, in response to receiving a confirmation instruction not to proceed with video editing.

In some embodiments, the apparatus further includes: a receiving module configured to wait, in a specified duration, for the user to perform an operation corresponding to the operation prompt, in response to receiving a confirmation instruction to proceed with video editing.

The video processing apparatus provided in this embodiment of the present disclosure can perform the video processing method provided in any of the embodiments of the present disclosure, and has corresponding functional modules and beneficial effects for performing the method.

It can be clearly understood by those skilled in the art that, for convenience and brevity of description, for the specific operation processes of the apparatus embodiment described above, reference may be made to the corresponding processes in the foregoing method embodiments, and details are not described herein again.

According to an embodiment of the present disclosure, an electronic device is further provided. The electronic device includes: a processor; and a memory configured to store processor-executable instructions; and the processor is configured to read the executable instructions from the memory, and execute the instructions to implement the video processing method according to any one of the embodiments described above.

Figure 6:
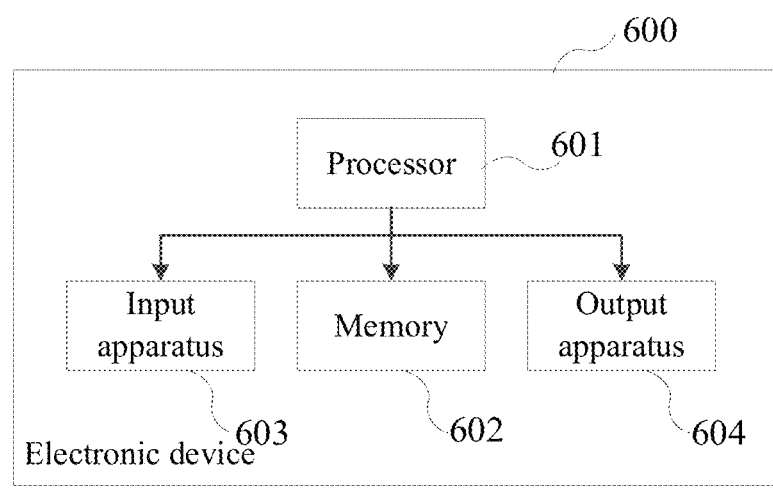
FIG. 6 is a schematic diagram of a structure of an electronic device according to an embodiment of the present disclosure.

FIG. 6 is a schematic diagram of a structure of an electronic device according to an embodiment of the present disclosure. As shown in FIG. 6, an electronic device 600 includes one or more processors 601 and a memory 602.

The processor 601 may be a central processing unit (CPU) or another form of processing unit having data processing capabilities and/or instruction execution capabilities, and may control other components in the electronic device 600 to perform desired functions.

The memory 602 may include one or more computer program products, which may include various forms of computer-readable storage media, such as a volatile memory and/or a non-volatile memory. The volatile memory may include, for example, a random access memory (RAM), and/or a cache memory (cache), etc. The non-volatile memory may include, for example, a read-only memory (ROM), a hard disk, a flash memory, etc. One or more computer program instructions may be stored on the computer-readable storage medium, and the processor 601 may execute the program instructions to implement the video processing method in the embodiments of the present disclosure described above and/or other desired functions. Various contents such as an input signal, a signal component, a noise component, etc. may also be stored in the computer-readable storage medium.

In an example, the electronic device 600 may further include an input apparatus 603 and an output apparatus 604. These components are interconnected via a bus system and/or another form of connection mechanism (not shown).

In addition, the input apparatus 603 may further include, for example, a keyboard, a mouse, etc.

The output apparatus 604 may output various information to the outside, including determined distance information, direction information, etc. The output apparatus 604 may include, for example, a display, a speaker, a printer, a communications network and a remote output apparatus connected thereto, etc.

Certainly, for simplicity, only some of the components in the electronic device 600 related to the present disclosure are shown in FIG. 6, and components such as buses, input/output interfaces, etc. are omitted. In addition, the electronic device 600 may further include any other appropriate components according to the specific applications.

In addition to the above method and device, an embodiment of the present disclosure may further be a computer program product, including computer program instructions that, when run by a processor, cause the processor to execute the video processing method provided in the embodiments of the present disclosure.

In the computer program product, program codes for performing the operations of the embodiments of the present disclosure may be written in any combination of one or more programming languages, where the programming languages include an object oriented programming language, such as Java, and C++, and further include conventional procedural programming languages, such as "C" language or similar programming languages. The program codes may be completely executed on a user computing device, partially executed on a user device, executed as an independent software package, executed partially on a user computing device and partially on a remote computing device, or completely executed on a remote computing device or a server.

In addition, an embodiment of the present disclosure may further be a computer-readable storage medium, having computer program instructions stored thereon, where the computer program instructions, when run by a processor, cause the processor to execute the video processing method provided in the embodiments of the present disclosure.

The computer-readable storage medium may be any combination of one or more readable media. The readable medium may be a readable signal medium or a readable storage medium. The readable storage medium may include, for example, but not limited to, an electronic, magnetic, optical, electromagnetic, infrared, or semiconductor system, apparatus, or device, or any combination thereof. More specific examples of the readable storage media (a non-exhaustive list) include: an electrical connection having one or more wires, a portable disk, a hard disk, a random access memory (RAM), a read-only memory (ROM), an erasable programmable read-only memory (EPROM or flash), an optic fiber, a portable compact disk read-only memory (CD-ROM), an optical storage device, a magnetic storage device, or any suitable combination thereof.

An embodiment of the present disclosure further provides a computer program product, including a computer program/instructions that, when executed by a processor, implement the video processing method in the embodiments of the present disclosure.

It should be noted that, herein, relative terms such as "first" and "second" are only used to distinguish one entity or operation from another entity or operation, and do not necessarily require or imply that such an actual relationship or order exists between these entities or operations. Moreover, the terms "include", "comprise", or any other variants thereof are intended to cover a non-exclusive inclusion, so that a process, a method, an article, or a device that includes a list of elements not only includes those elements but also includes other elements that are not listed, or further includes elements inherent to such a process, method, article, or device. In the absence of more restrictions, an element defined by "including a . . . " does not exclude another same element in a process, method, article, or device that includes the element.

The above description illustrates merely specific implementations of the present disclosure, so that those skilled in the art can understand or implement the present disclosure. Various modifications to these embodiments are apparent to those skilled in the art, and the general principle defined herein may be practiced in other embodiments without departing from the spirit or scope of the present disclosure. Therefore, the present disclosure is not limited to the embodiments described herein but is to be accorded the broadest scope consistent with the principle and novel features disclosed herein.

The invention claimed is:

1. A video processing method, comprising:
obtaining a reference editing operation sequence specified by a user, wherein the reference editing operation sequence comprises a plurality of reference editing operations arranged in a sequential order of operations;
providing operation prompts on a video editing interface according to the sequential order of the plurality of reference editing operations, to direct the user to perform the plurality of reference editing operations on a target video step by step;

displaying a plurality of elements on the video editing interface, wherein each of the plurality of elements corresponds to one of the plurality of reference editing operations, and wherein each of the plurality of elements has a disabled state and an enabled state;

switching at least one subset of the plurality of elements from the disabled state to the enabled state in response to receiving input on the at least one subset of the plurality of elements; and performing at least one subset of the plurality of reference editing operations corresponding to the at least one subset of the plurality of elements.

2. The method according to claim 1, wherein the providing operation prompts according to the sequential order of the reference editing operations comprises:

for a first editing operation in the reference editing operation sequence, initiating an operation prompt for a first element of the plurality of elements corresponding to the first editing operation on the video editing interface, so that the user performs the first editing operation on the target video through the first element corresponding to the first editing operation; and for a non-first editing operation in the reference editing operation sequence, initiating an operation prompt for a second element of the plurality of elements corresponding to the non-first editing operation on the editing operation interface if it is detected that the user has performed a previous editing operation, so that the user performs the non-first editing operation on the target video through the second element corresponding to the non-first editing operation.

3. The method according to claim 1, wherein the obtaining a reference editing operation sequence specified by a user comprises:

performing editing operation parsing on a template video selected by the user, to obtain an editing operation sequence of the template video, wherein the template video is a video obtained by editing at least one original material clip in an editing manner indicated by a preset editing template; and using the editing operation sequence of the template video as the reference editing operation sequence specified by the user.

4. The method according to claim 1, further comprising: returning a current editing state presented by the target video to a previous editing state in response to an operation undo instruction of the user, wherein the current editing state is a video presentation state corresponding to an operation to be undone that is indicated by the operation undo instruction, and the previous editing state is a video presentation state corresponding to a previous editing operation of the operation to be undone.

5. The method according to claim 1, further comprising: performing a specified end operation in response to receiving a stop instruction or in response to completing a last editing operation of the reference editing operation sequence, wherein the end operation comprises at least one of a video save operation and a video editing interface exit operation.

6. The method according to claim 1, further comprising at least one of the following:

returning a current editing state presented by the target video to an initial state of the target video in response to receiving a restart instruction; or returning a current editing state presented by the target video to an initial state of the target video after a last editing operation of the reference editing operation sequence is completed, in response to receiving a loop playback instruction.

7. The method according to claim 2, wherein initiating the operation prompt for the second element corresponding to the non-first editing operation on the editing operation interface comprises:

switching the second element corresponding to the non-first editing operation from the disabled state to an enabled state, and initiating, on the video editing interface in a specified manner, a prompt message that the second element is enabled.

8. The method according to claim 1, wherein the providing operation prompts according to the sequential order of the reference editing operations comprises:

determining a current reference editing operation to be performed based on the sequential order of the reference editing operations and a current presentation state of the target video; and using an element corresponding to the current reference editing operation to be performed as a target element, switching the target icon element from the disabled state to the enabled state, and initiating, in a specified manner, a prompt message that the target element is enabled.

9. The method according to claim 1, further comprising: initiating an inquiry message about whether to proceed with video editing, in response to more than a preset duration having lapsed before the user performs a corresponding operation for the initiated operation prompt; and performing at least one of a video save operation and a video editing interface exit operation, in response to receiving a confirmation instruction not to proceed with video editing.

10. The method according to claim 9, further comprising: waiting, in a specified duration, for the user to perform an operation corresponding to the operation prompt, in response to receiving a confirmation instruction to proceed with video editing.

11. The method according to claim 7, wherein an icon corresponding to a play operation, an icon corresponding to a pause operation, and an icon corresponding to a video progress drag operation that are displayed on the video editing interface are all in the enabled state.

12. An electronic device, comprising:
a processor; and
a memory configured to store instructions executable by the processor, wherein the processor is configured to read the executable instructions from the memory, and execute the executable instructions to:

obtain a reference editing operation sequence specified by a user, wherein the reference editing operation sequence comprises a plurality of reference editing operations arranged in a sequential order of reference operations;

provide operation prompts on a video editing interface according to the sequential order of the plurality of reference editing operations, to direct the user to perform the plurality of reference editing operations on a target video step by step;

display a plurality of elements on the video editing interface, wherein each of the plurality of elements corresponds to one of the plurality of reference editing operations, and wherein each of the plurality of elements has a disabled state and an enabled state;

switching at least one subset of the plurality of elements from the disabled state to the enabled state in response to receiving input on the at least one subset of the plurality of elements; and performing at least one subset of the plurality of reference editing operations corresponding to the at least one subset of the plurality of elements.

13. A non-transitory computer-readable storage medium having a computer program stored thereon, wherein the computer program when executed by a processor, cause the processor to:

obtain a reference editing operation sequence specified by a user, wherein the reference editing operation sequence comprises a plurality of reference editing operations arranged in a sequential order of reference operations;

provide operation prompts on a video editing interface according to the sequential order of the plurality of reference editing operations, to direct the user to perform the plurality of reference editing operations on a target video step by step;

display a plurality of elements on the video editing interface, wherein each of the plurality of elements corresponds to one of the plurality of reference editing operations, and wherein each of the plurality of elements has a disabled state and an enabled state;

switching at least one subset of the plurality of elements from the disabled state to the enabled state in response to receiving input on the at least one subset of the plurality of elements; and performing at least one subset of the plurality of reference editing operations corresponding to the at least one subset of the plurality of elements.

14. The electronic device according to claim 12, wherein the providing operation prompts according to the sequential order of the reference editing operations comprises:

for a first editing operation in the reference editing operation sequence, initiating an operation prompt for a first element of the plurality of elements trigger control corresponding to the first editing operation on an editing operation the video editing interface, so that the user performs the first editing operation on the target video through the trigger control first element corresponding to the first editing operation; and for a non-first editing operation in the reference editing operation sequence, initiating an operation prompt for a second element of the plurality of elements corresponding to the non-first editing operation on the editing operation interface if it is detected that the user has performed a previous editing operation, so that the user performs the non-first editing operation on the target video through the second element corresponding to the non-first editing operation.

15. The electronic device according to claim 12, wherein the obtaining a reference editing operation sequence specified by a user comprises:

performing editing operation parsing on a template video selected by the user, to obtain an editing operation sequence of the template video, wherein the template video is a video obtained by editing at least one original material clip in an editing manner indicated by a preset editing template; and using the editing operation sequence of the template video as the reference editing operation sequence specified by the user.

16. The electronic device according to claim 12, wherein the processor is further configured execute the executable instructions to:

return a current editing state presented by the target video to a previous editing state in response to an operation undo instruction of the user, wherein the current editing state is a video presentation state corresponding to an operation to be undone that is indicated by the operation undo instruction, and the previous editing state is a video presentation state corresponding to a previous editing operation of the operation to be undone.

17. The electronic device according to claim 12, wherein the processor is further configured execute the executable instructions to perform at least one of the following:

returning a current editing state presented by the target video to an initial state of the target video in response to receiving a restart instruction; or returning a current editing state presented by the target video to an initial state of the target video after a last editing operation of the reference editing operation sequence is completed, in response to receiving a loop playback instruction.

18. The electronic device according to claim 14, wherein initiating the operation prompt for the for the second element corresponding to the non-first editing operation on the editing operation interface comprises:

switching the second element corresponding to the non-first editing operation from the disabled state to an enabled state, and initiating, on the video editing interface in a specified manner, a prompt message that the second element is enabled.

19. The electronic device according to claim 12, wherein the providing operation prompts according to the sequential order of the reference editing operations comprises:

determining a current reference editing operation to be performed based on the sequential order of the reference editing operations and a current presentation state of the target video; and using an element corresponding to the current reference editing operation to be performed as a target element, switching the target icon element from the disabled state to the enabled state, and initiating, in a specified manner, a prompt message that the target element is enabled.

20. The electronic device according to claim 12, wherein the processor is further configured execute the executable instructions to:

initiate an inquiry message about whether to proceed with video editing, in response to more than a preset duration having lapsed before the user performs a corresponding operation for the initiated operation prompt; and perform at least one of a video save operation and a video editing interface exit operation, in response to receiving a confirmation instruction not to proceed with video editing.

* * * * *